United States Patent [19]

Endo et al.

[11] 4,169,669

[45] Oct. 2, 1979

[54] FILM WINDING DEVICE FOR SLIDE PROJECTORS

[75] Inventors: Tadakazu Endo, Fuchiu; Susumu Nomura; Masato Matsumoto, both of Tokyo; Kojiro Takahashi, Yokohama, all of Japan

[73] Assignee: Shinano Kikaku Company Limited, Tokyo, Japan

[21] Appl. No.: 888,986

[22] Filed: Mar. 22, 1978

[30] Foreign Application Priority Data

| Mar. 24, 1977 | [JP] | Japan | 52-31627 |
| Mar. 24, 1977 | [JP] | Japan | 52-34730[U] |
| Mar. 24, 1977 | [JP] | Japan | 52-34731[U] |

[51] Int. Cl.² ............................................. G03B 1/48
[52] U.S. Cl. .................... 353/95; 242/55.21; 353/DIG. 2
[58] Field of Search ............. 242/55.21; 353/95, 96, 353/DIG. 2, 122; 352/128

[56] References Cited

U.S. PATENT DOCUMENTS

| 1,827,101 | 10/1931 | Patterson | 353/96 |
| 1,868,252 | 7/1932 | Ponting et al. | 352/124 |
| 2,330,709 | 9/1943 | Harper et al. | 353/DIG. 2 |
| 2,812,177 | 11/1957 | Kleerup | 242/55.21 |

FOREIGN PATENT DOCUMENTS

| 883522 | 3/1943 | France | 353/95 |
| 598483 | 2/1948 | United Kingdom | 353/DIG. 2 |

Primary Examiner—Harry N. Haroian
Attorney, Agent, or Firm—Cushman, Darby & Cushman

[57] ABSTRACT

A film winding device for slide projectors of a type using strip films comprising a film housing case capable of being removably fitted to a projector body, a film guide guiding a projected film toward the film housing case, a leading ring mounted rotatably on the end portion of the film guide and capable of leading in the projected film at the tip so as to come to the outside within the film housing case and a roller means arranged so as to be able to positively feed the projected film even in the end portion into the film housing case, whereby the film having finished being projected can be housed successively into the film housing case so as to be projectable without being rewound. In this slide projector, the film to be projected can be easily taken at the tip to the position of the film guide by pushing a button.

8 Claims, 10 Drawing Figures

FILM WINDING DEVICE FOR SLIDE PROJECTORS

BACKGROUND OF THE INVENTION (a) Field of the Invention

This invention relates to film winding devices adapted to slide projectors of a type using strip films.

(b) Description of Prior Art

There is already a type of slide projector of a type of using strip films wherein a strip film wound in the form of a roll is placed on the upper portion of a projector body and is wound into a housing part provided in the lower portion of the projector body by means of a sprocket means through a film gate. However, in the case of such type, when a once projected film is reprojected as it is, the projecting order will be reversed. Therefore, in practice, it is usual to rewind the projected film. As a result, this enforces a trouble more than is necessary on the operator in practice.

SUMMARY OF THE INVENTION

A primary object of the present invention is to provide a slide projector wherein a projected film portion can be automatically wound into a film housing case without reversing the projecting order in order to eliminate such trouble.

This object is attained by spirally forming the end portion of a film guide to guide the projected film portion advanced by a sprocket, rotatably mounting a leading ring on the end portion of said spirally formed film guide and removably fitting the film housing case to said leading ring.

Another object of the present invention is to provide a film winding device wherein a film can be always smoothly and positively advanced into a film housing case and even the end portion of the film can be positively fed into the film housing case.

A further object of the present invention is to provide a film feeding device wherein a film can be reversely fed also very smoothly.

DESCRIPTION OF THE PREFERRED EMBODIMENTS

Figure 1:
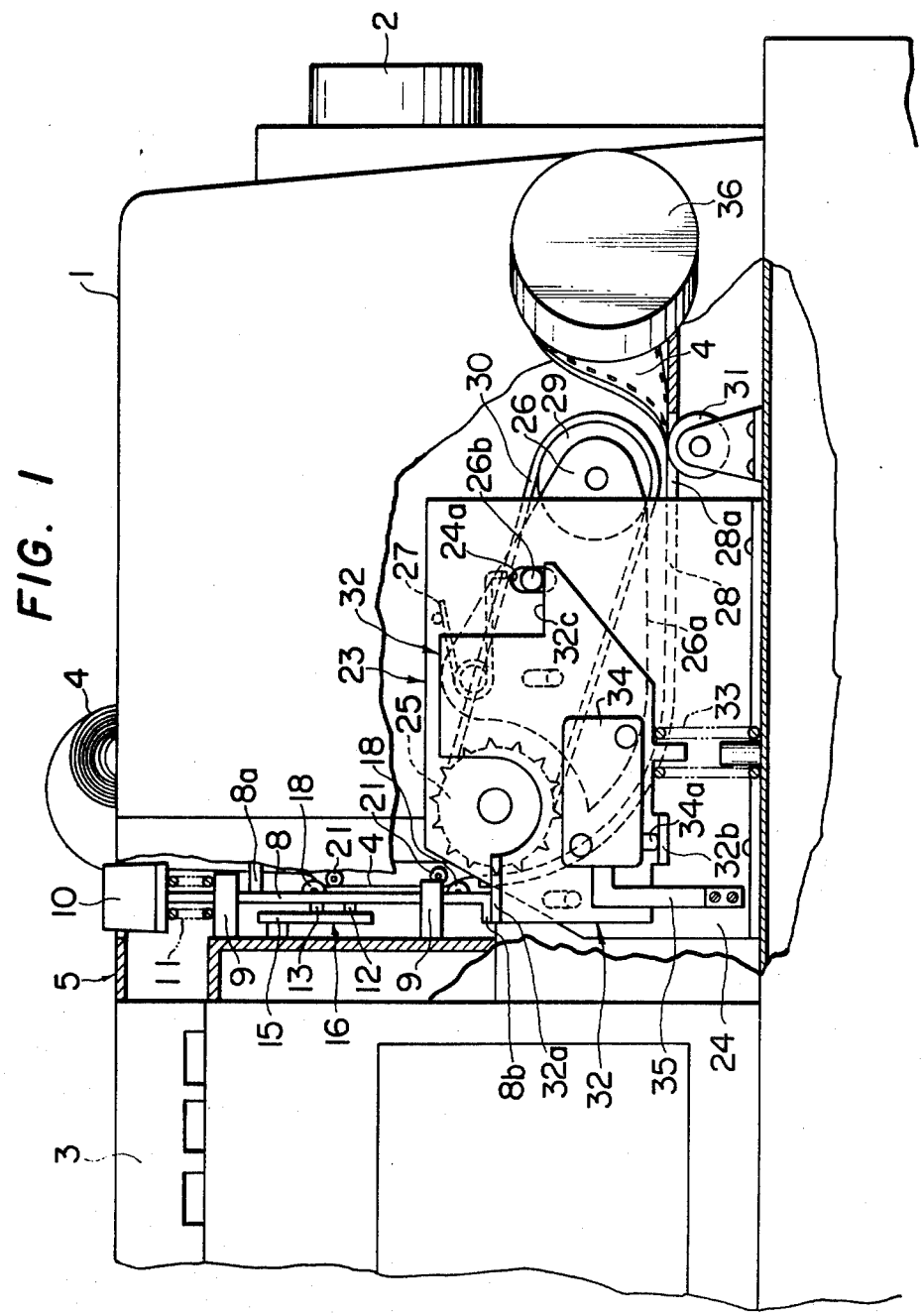
FIG. 1 is a side elevational view showing a slide projector incorporating a film winding device according to the present invention as partly sectioned.
Figure 2:
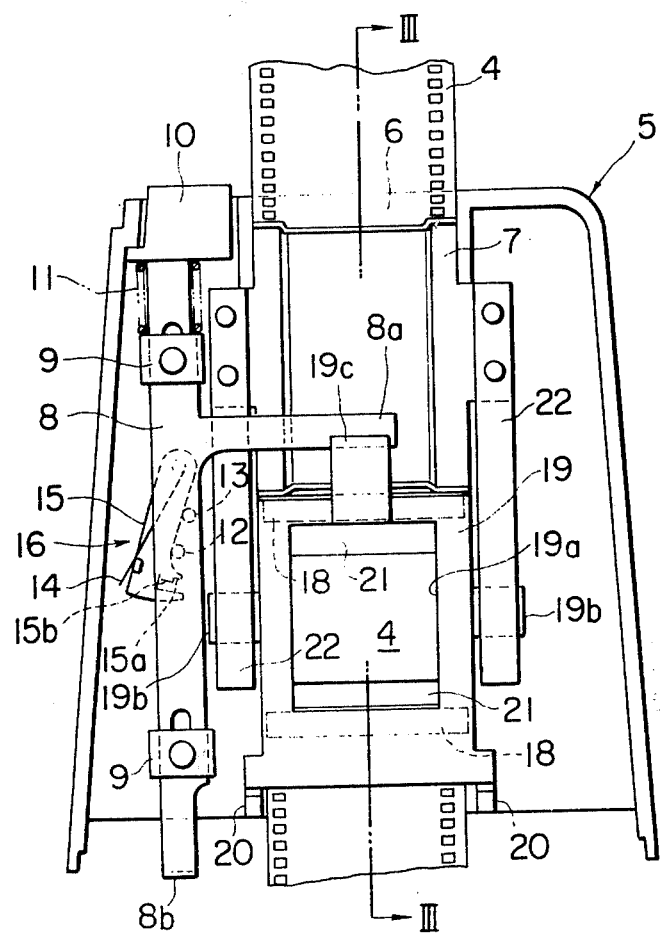
FIG. 2 is an enlarged elevational view of a film loading portion of the projector shown in FIG. 1.
Figure 3:
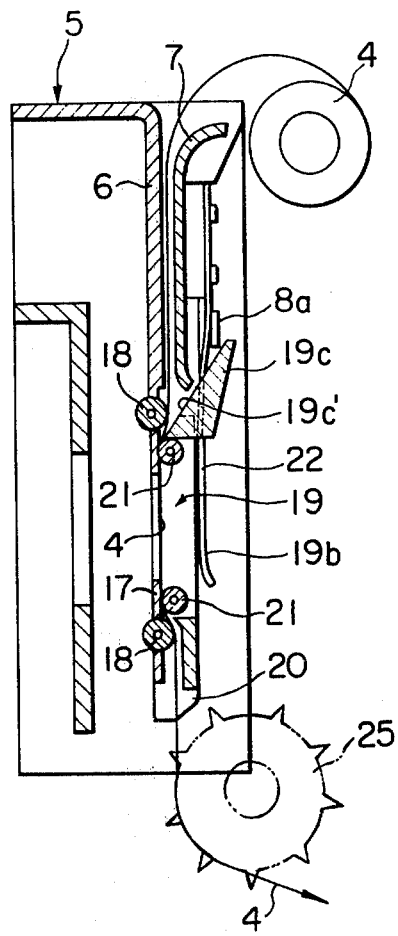
FIG. 3 is a sectional view on line III—III in FIG. 2.
Figure 4:
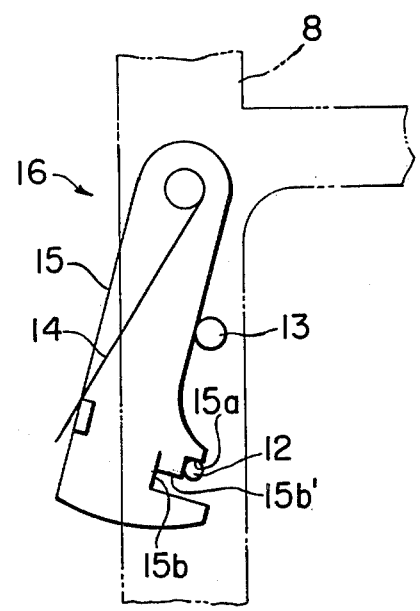
FIG. 4 is an elevational view of an operating rod locking means shown in FIG. 1.
Figure 5:
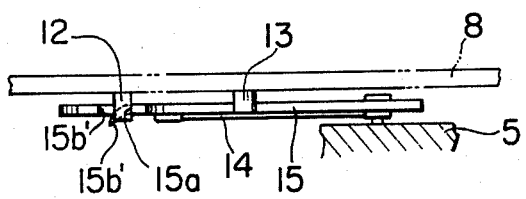
FIG. 5 is a right side elevational view of FIG. 4.
Figure 6:
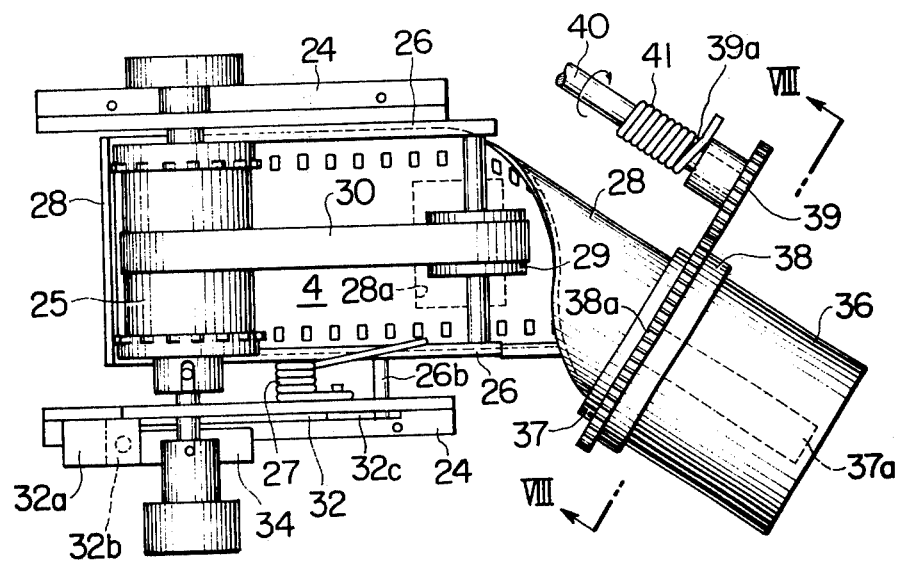
FIG. 6 is a plane view of a film guide portion of the projector shown in FIG. 1.
Figure 7:
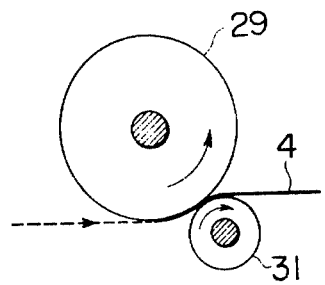
FIG. 7 is a side view showing a film feeding roller and sustaining roller shown in FIG. 1 in contact with each other.
Figure 8:
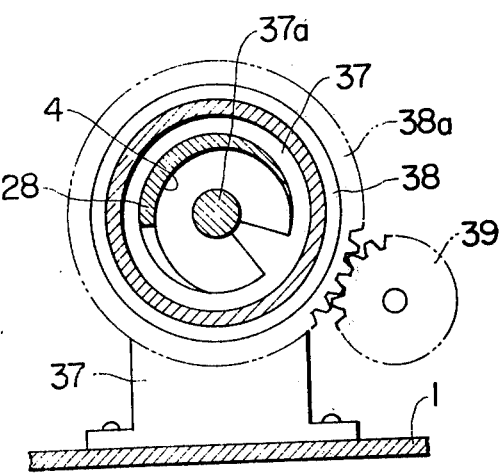
FIG. 8 is a sectional view on line VIII—VIII in FIG. 6.

Referring to FIGS. 1 to 8, reference numeral 1 indicates a slide projector body in which a projecting lens 2 is arranged in the front portion, a lamp house 3 is arranged in the rear portion and a film loading frame 5 for inserting the tip portion of a strip film 4 wound in the form of a roll into a projecting position is provided in the rear portion so as to be removable from the projector body 1. Reference numeral 6 indicates a partition wall provided substantially in the middle portion of the frame 5 and forming a film passage between it and a guide plate 7 fixed oppsite it. Reference numeral 8 indicates an operating rod having an arm portion 8a extending in the horizontal direction, supported slidably in the vertical direction by a pair of guides 9 fixed to the frame 5, biased upward by a spring 11 arranged between an operating button 10 secured to the upper end of said operating rod 8 and the guides 9 and acting to open a later described film pressing plate with the arm portion 8a when lowered. A pair of pins 12 and 13 are secured with a spacing between them substantially in the middle portion of the operating rod 8 and form a locking means 16 together with a locking lever 15 pivoted to the frame 5 and biased counterclockwise in FIG. 2 by a spring 14. When the operating button 10 is pushed to lower the operating rod 8, the rod will be once locked and, when the button 10 is further pushed, the rod 8 will be unlocked and will return to the original position. That is to say, when in such normal state as is shown in FIG. 2, both pins 12 and 13 will be in contact with the right side edge of the locking lever 15 but, when the operating rod 8 is lowered, as shown in FIG. 4, the pin 12 will first engage with a cut-off portion 15a of the locking lever 15 to lock the operating rod 8 in that position. Then, when the operating rod 8 is further lowered, the pin 12 will tend to engage with a hook portion 15b of the locking lever 15 but, as a tongue portion 15b' curved to the back side of the locking lever 15 as clearly shown in FIG. 5 is provided on the upper side edge of this hook portion 15b, the pin 12 will separate from the hook portion 15b and thus the operating rod 8 will be unlocked and will return to the original normal position due to the resiliency of the spring 11 and the guide of the pin 13. Further, the operating rod 8 is in contact at the lower end 8b with a bent portion 32a of a later described operating plate 32 so as to be able to vertically move the operating plate 32 with the vertical movement of the operating rod 8. Reference numeral 17 indicates a projecting window frame fixed to the lower portion of the partition wall 6. A pair of rollers 18 rectangular to the advancing direction of the film 4 and parallel with each other are rotatably fitted respectively above and below the projecting window frame. Reference numeral 19 indicates the film pressing plate fitted rotatably clockwise in FIG. 3 with a sustaining member 20 provided in the lower portion of the frame 5 as a fulcrum. A pair of rollers 21 parallel with the rollers 18 are rotatably fitted respectively above and below a window 19a in the central portion of the film pressing plate 19 which is biased by two plate springs 22 fixed to the frame 5 so as to be able to press the film 4 leftward in FIG. 3 through arm portions 19b provided on both sides of the film pressing plate 19. Further, a projection 19c having a slope 19c' contacting the arm portion 8a of the operating rod 8 is provided in the middle of the upper portion of the film pressing plate 19 so as to serve to move the film pressing plate 19 rightward in FIG. 3 against the resiliency of the plate springs 22 when the operating rod 8, that is, the arm portion 8a is lowered. Reference numeral 23 indicates a film feeding mechanism provided below the film loading frame 5 and having a sprocket 25 and roller supporting plate 26 pivoted to the side plate 24. The roller supporting plate 26 is biased clockwise by a spring 27, has the lower edge made an upper guide 26a for the film 4 and forms a film passage between it and a film guide 28 fixed to the slide projector body 1 below it. Said film guide 28 is so formed as to enclose in our end portion a portion of the sprocket 25, is so twisted as to form in the other end portion a part of a spiral and has a through hole 28a made in the part corresponding to a later described feeding roller. Reference numeral 29 indicates the feeding roller pivoted to the roller supporting plate 26 so as to be rotated by a belt 30 hung on the shaft portion of the sprocket 25. A sustaining roller 31 is rotatably arranged below the feeding roller 29 with the film guide 28 between them so as to be able to hold and forcibly advance the film 4 through the through hole 28a when the feeding roller 29 is moved downward. The feeding roller 29 and sustaining roller 31 are so selected in the relative positions that, when they contact with each other, the line of contact may be positioned forward and upward of the advancing direction of the film as shown in FIG. 7. Reference numeral 32 indicates the operating plate supported slidably in the vertical direction outside the side plate 24 by a pin-slot connection, biased upward by a spring 33 stronger than the spring 27 and, as described above, contacting in the upper bent portion 32a with the lower end 8b of the operating rod 8 and in the lower bent portion 32b with an operating piece 34a of a switch 34. Said switch 34 is fixed on the side plate 24 through a supporting member 35 so as to be on to start the rotation of the sprocket 25 when the operating plate 32 is lowered in the lower bent portion 32b and to be off to stop the rotation of the sprocket 25 when the lower bent portion 32b is in the illustrated position. A stepped portion 32c provided in the operating plate 32 is engaged with a pin 26b secured on the roller supporting plate 26 and passed through a slot 24a provided in the side plate 24. Therefore, when the operating plate 32 is in such position as is shown in FIG. 1, the sprocket 25 will stop the rotation and, at the same time, the roller 29 will be in a position raised by the spring 33. When the operating plate 32 is lowered, the sprocket 25 will start the rotation and, at the same time, the feeding roller 29 will be pressed against the sustaining roller 31 by the spring 27. However, the sprocket 25 can be intermittently automatically rotated by a separate signal or can be reversely rotated by another switch not illustrated. Reference numeral 36 indicates a film housing case provided in front of the above mentioned film feeding mechanism 23 and arranged so as to be able to house the film 4 having passed below the feeding roller 29. The arrangement of this part is shown in FIG. 8. That is to say, reference numeral 37 indicates a leading ring connected to the cylindrical end edge of the spirally twisted film guide 28 and having a column portion 37a integrally formed in the center. Reference numeral 38 indicates a rotary ring mounted rotatably with respect to the leading ring 37 outside it and having a gear portion 38a on the outer periphery. Reference numeral 39 indicates a drive pinion supported rotatably on a member integral with the projector body 1, meshed with the gear portion 38a and connected with a drive shaft 40 which can be rotated by a prime mover for driving for example, the sprocket 25 through a later described spring clutch. That is to say, the drive shaft 40 is freely rotatably fitted to the pinion 39 and a coil spring 41 is closely wound on the drive shaft 40 and is hung at one end on a pin 39a on the pinion 39 so as to fasten the drive shaft 40 to rotate the pinion 39 in the same direction when the drive shaft 40 normally rotated (in the direction indicated by the arrow in FIG. 6) but to be loosened to transmit no rotation to the pinion 39 when the drive shaft 40 reversely rotates (in the direction reverse to the direction indicated by the arrow in FIG. 6). The film housing case 36 can be removably mounted on the rotary ring 38 from outside the projector body 1. In such case, the inside diameter of the leading ring 37 is so selected as to be smaller than the inside diameter of the film housing case 36 and the length of the column portion 37a is so selected as to reach the vicinity of the bottom portion of the film housing case 36 mounted on the rotary ring 38.

The operation of the above mentioned device shall be explained in the following.

Prior to the foading of the film, first the operating button 10 is pushed to lower the operating rod 8 until it is locked by the locking means 16. At this time, the arm portion 8a will lower while in contact with the slope 19c' of the projection 19c of the film pressing plate 19, therefore the film pressing plate 19 will be rotated clockwise in FIG. 3 with its lower end edge as a center and the pair of rollers 21 will separate from the corresponding pair of rollers 18. On the other hand, with the fall of the operating rod 8, the operating plate 32 will be also lowered against the spring 33. Therefore, the switch 34 will be switched on and the sprocket 25 will start rotating counterclockwise. Following the fall of the operating plate 32, the roller supporting plate 26 will rotate clockwise and the feeding roller 29 will come into contact with the sustaining roller 31 through the through hole 28a.

In this state, when the rollshaped film 4 placed in a predetermined position of the projector body 1 is pulled out at the tip and is inserted from above the guide plate 7, the tip portion of the film 4 will easily reach the position of the sprocket 25. Thus the perforations formed on the film 4 will engage with the teeth of the sprocket 25 and therefore the film 4 will be fed further forward along the film guide 28. When the operating button 10 is then further pushed, the operating rod 8 will be unlocked and will be therefore raised by the spring 11 to return to the normal position. Then, the film pressing plate 19 will be rotated counterclockwise in FIG. 3 by the plate springs 22 to press the film 4 against the projecting window 17. On the other hand, at the same time, the operating plate 32 will be raised by the spring 33, therefore the switch 34 will return to be off and the rotation of the sprocket 25 will stop. At this time, the feeding roller 29 will be raised to separate from the sustaining roller 31. Lastly, when the empty film housing case 36 is mounted on the rotary ring 38, the preparation for projection will be completed. Thus, when the light source of the lamp house 3 is lighted and the sprocket 25 is intermittenlly automatically rotated by a separate signal, the projection will be started. In such case, the feeding roller 29 will be in a raised position and therefore, whenever the sprocket 25 is rotated, the tip of the film 4 will be intermittently smoothly advanced along the film guide 28 to reach the vicinity of the leading ring 37. In this zone, the tip portion of the film 4 will be spirally twisted by the film guide 28 and will therefore advance into the film housing case 36 while describing a spiral with the continued advance of the film 4. Therefore, the film portion successively advancing into the case 36 will be wound in inside by inside. This winding motion will be made very smoothly by the rotation of the film housing case 36 in the same direction as the spiral direction of the film portion through the rotary ring 38. When the greater part of the strip film 4 of a predetermined length has been thus wound into the housing case 36 and the end portion of the film 4 has separated from the sprocket 25, the projection will be substantially finished. When the projection thus ends, the light source will be put out but, at the same time, when the operating button 10 is pushed again to lock the operating rod 8 in the lowered position, the sprocket 25 and feeding roller 29 will continuously rotate, the feeding roller 29 will lower to press the film 4 against the sustaining roller 31 and therefore the film 4 will be automatically fed until its end separates from the feeding roller 29. In such case, the line of contact of the feeding roller 29 and sustaining roller 31 will be positioned forward and upward of the advancing direction of the film as described above, therefore the end of the film 4 will be sprung out forward and upward of the outer periphery of the feeding roller 29 by the rotation of said roller 29 as shown in FIG. 7 and will be all automatically housed within the housing case 36 by the cooperative action with the curling of the film 4. In fact, whether the end of the film 4 has perfectly entered the housing case 36 or not can be known by the change of the sound. Therefore, after it is confirmed that the end of the film 4 has perfectly entered the housing case 36, if the operating button 10 is further pushed, the operating rod 8 will be unlocked, the rotation of the sprocket 25 and feeding roller 29 will stop and one projecting operation will all end. The state of the film roll housed in the housing case 36 will be such that the tip portion of the film, that is, the first projected frame portion will be outside and the later frame portions will be successively inside. The film housing case 36 is removed from the rotary ring 38, the end portion of the film is pushed into the case 36 by hand and the case is covered with a proper cap and is preserved. In case this film is to be projected again, as the order of the frames is already normal, it can be readily projected.

Generally, in this type of slide projector, a once projected film frame may be required to be returned and projected once again. In such case, a reversing switch not illustrated may be switched on. That is to say, when the reversing switch is on, the sprocket 25 will be reversely rotated by a prime mover not illustrated to reversely feed the film 4. In such case, the drive shaft 40 will be rotated in the direction reverse to the direction indicated by the arrow in FIG. 6, therefore the coil spring 41 will be loosened and the rotation of the drive shaft 40 will not be transmitted to the pinion 39. As a result, the film housing case 36 will be only pulled by the film 4 so as to be reversely rotated. Therefore, in such rewinding case, the rotating speed of the film housing case 36 will follow the reversely feeding speed of the film by the rotation of the sprocket 25 and therefore the film 4 will be able to be rewound very smoothly.

Figure 9:
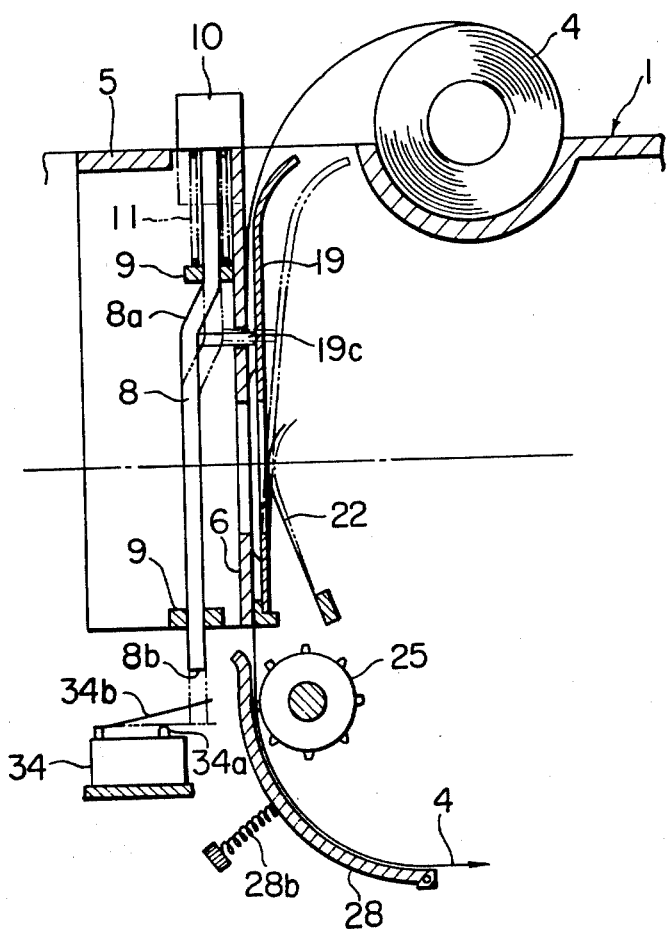
FIG. 9 is a side elevational view showing another embodiment of a film loading portion.

FIG. 9 shows another embodiment of the film loading means. This embodiment is made more simple than the already explained film loading means. That is to say, in this embodiment, the locking means 16 is eliminated so that, while the film 4 is inserted until it reaches the position of the sprocket 25, the operating button 10 may be kept on being pushed. This embodiment shall be briefly explained in the following by using the same reference numerals for substantially the same parts and portions as of the embodiment shown in FIGS. 2 and 3.

That is to say, a bent portion 8a is formed on the operating rod 8 so as to be in contact at the lower end 8b with the bent portion 32a of the operating plate 32 and at the same time to be directly engageable with the operating piece 34b of the switch 34. The pin 19c set on the film pressing plate 19 is slidably inserted through the partition wall 6 and is in contact at the tip with the portion below the bent portion 8a of the operating rod 8. Therefore, when the operating button 10 is pushed in to the chain line position in FIG. 9, the operating rod 8 will lower to switch the switch 34 on, lower the operating plate 32 and rotate the sprocket 25 and film feeding roller 29. On the other hand, at the same time, the pin 19c will be pushed rightward by the bent portion 8a, therefore the film pressing plate 19 will move rightward as illustrated by the chain line in FIG. 9 and a proper air gap will be formed between the partition wall 6 and film pressing plate 19. Therefore, in the same manner as in the case of the already explained embodiment, the tip portion of the film 4 can be easily inserted to the position reaching the sprocket 25. When the perforations of the film 4 thus engage with the sprocket 25, if the push of the operating button 10 is released, the film pressing plate 19 will be returned to the solid line position by the plate springs 22 to press the film 4 against the partition wall 6 and return the switch 34 to be off. The subsequent operation is as already explained and therefore the further explanation shall be omitted.

Figure 10:
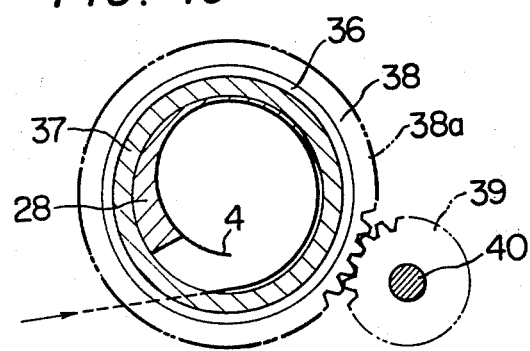
FIG. 10 is a sectional view showing another embodiment of the portion corresponding to FIG. 8.

The embodiment shown in FIG. 10 is different from the embodiment shown in FIG. 8 in respect that the column portion 37a is not provided in the leading ring 37.

In the above explained embodiment, the film feeding roller 29 is so made as to be held in a position separated from the sustaining roller 31 during the normal projecting operation. However, these rollers may be so formed as to be always in contact with each other. Further, in the above mentioned embodiment, the feeding roller 29 is so made as to be rotated by the belt 30 stretched between it and the sprocket 25 and the rotary ring 38 is so made as to be forcibly rotated by the drive pinion 39. However, this feeding roller 29 may be so made as to be rotated through a proper power transmitting mechanism by the prime mover, for example, for the sprocket 25 without using the belt 30 or to be rotated by rotating the sustaining roller 31 in the same manner as this. Further, it is not always necessary to give a forced torque to the rotary ring 38.

What is claimed is:

1. A film winding device for slide projectors, comprising:
   a projecting frame provided within a projector body;
   a film pressing plate means arranged adjacently to said projecting frame and capable of pressing a strip film to be projected against said projecting frame;
   a sprocket rotatably mounted on said projector body below said film pressing plate means and capable of feeding said film;
   a film guide provided below said sprocket and having one end portion enclosing a part of said sprocket and having the other end portion formed to be spiral and capable of guiding the film fed by the sprocket;
   a leading ring secured to the other end portion of said film guide;

a rotary ring rotatably mounted on said leading ring and a film housing case capable of being removably mounted to said rotary ring;

a driving mechanism connected with said rotary ring and capable of rotating as synchronized with said sprocket, whereby said strip film may be successively wound in by the cooperative action of said film guide and leading ring to be positioned so that the tip of the film lies at the outside within said film housing case.

2. A film winding device according to claim 1, wherein said film winding device further comprises:

a pair of rollers arranged as opposed to each other on both sides of said film guide between said sprocket and leading ring and arranged separably from each other; and an operating rod provided adjacently to said film pressing plate means and capable of respectively separating said film pressing plate means from said projecting frame and one of the rollers of said pair from the other when pressed.

3. A film winding device according to claim 1 wherein said driving mechanism includes a one-way clutch by which said driving mechanism is disconnected from said rotary ring at the time of reverse rotation of said film housing case.

4. A film winding device according to claim 1 wherein said film winding device further comprises a pair of rollers arranged as opposed to each other on both sides of said film guide between said sprocket and leading ring and either of the rollers of said pair is rotated to feed the film at a speed coinciding with the film feeding speed by said sprocket.

5. A film winding device according to claim 4 wherein the line of contact of said pair of rollers is positioned forward and upward of the advancing direction of the film.

6. A film winding device according to claim 5 wherein one of the rollers of said pair is arranged separably from the other.

7. A film winding device according to claim 1 wherein said film winding device further comprises a roller means provided between said sprocket and leading ring and capable of being rotated by said sprocket through a belt hung between said sprocket and roller means, the film being able to be fed out by the cooperative action of said roller means and belt.

8. A film winding device according to claim 2 wherein said film winding device further comprises a locking means provided adjacently to said operating rod, said operating rod being locked in the pressed position by said locking means when said operating rod is pressed by one step, and said operating rod being unlocked when said operating rod is further pressed.

* * * * *